US011228180B2

(12) United States Patent
Zhou et al.

(10) Patent No.: US 11,228,180 B2
(45) Date of Patent: Jan. 18, 2022

(54) HIERARCHICAL DISTRIBUTED VOLTAGE REGULATION

(71) Applicants: Alliance for Sustainable Energy, LLC, Golden, CO (US); The Regents of the University of Colorado, a body corporate, Denver, CO (US)

(72) Inventors: Xinyang Zhou, Golden, CO (US); Changhong Zhao, Lakewood, CO (US); Zhiyuan Liu, Boulder, CO (US); Lijun Chen, South Pasadena, CA (US)

(73) Assignees: Alliance for Sustainable Energy, LLC, Golden, CO (US); The Regents of the University of Colorado, a body corporate, Denver, CO (US)

( * ) Notice: Subject to any disclaimer, the term of this patent is extended or adjusted under 35 U.S.C. 154(b) by 29 days.

(21) Appl. No.: 16/925,225

(22) Filed: Jul. 9, 2020

(65) Prior Publication Data

US 2021/0013720 A1    Jan. 14, 2021

Related U.S. Application Data

(60) Provisional application No. 62/871,769, filed on Jul. 9, 2019.

(51) Int. Cl.
*H02J 3/38* (2006.01)
*G05B 19/04* (2006.01)
(Continued)

(52) U.S. Cl.
CPC ........... *H02J 3/381* (2013.01); *G05B 19/042* (2013.01); *H02J 13/00002* (2020.01);
(Continued)

(58) Field of Classification Search
None
See application file for complete search history.

(56) References Cited

U.S. PATENT DOCUMENTS

| | | | |
|---|---|---|---|
| 8,886,744 B1 * | 11/2014 | Pabla | G06F 9/505 709/217 |
| 9,081,620 B1 * | 7/2015 | Chaubal | G06F 11/3051 |

(Continued)

OTHER PUBLICATIONS

Lo et al., "Decentralized Controls and Communications for Autonomous Distribution Networks in Smart Grid", Apr. 4, 2012, IEEE Transactions on Smart Grid, vol. 4, No. 1, Mar. 2013. (Year: 2012).*

(Continued)

*Primary Examiner* — Mohammad Ali
*Assistant Examiner* — Kelvin Booker
(74) *Attorney, Agent, or Firm* — Robert G. Pittelkow

(57) ABSTRACT

Embodiments of the disclosure provide for hierarchically distributed voltage regulation and power flow optimization in a power distribution network. According to one embodiment, a regional coordinator system may determine power flow for an autonomous grid (AG) representing a portion of the distribution network based on a set of voltage parameters from nodes in the AG. The set of voltage parameters my include a current voltage magnitude. The regional coordinator system may provide, to a central controller system of the distribution network, one or more power flow parameters based on the determined power flow for the AG.

16 Claims, 6 Drawing Sheets

(51) Int. Cl.
*H02J 3/32* (2006.01)
*H02J 13/00* (2006.01)
*G05B 19/042* (2006.01)

(52) U.S. Cl.
CPC ......... *G05B 2219/2639* (2013.01); *H02J 3/32* (2013.01); *H02J 2300/24* (2020.01); *H02J 2300/28* (2020.01)

(56) References Cited

U.S. PATENT DOCUMENTS

| | | | | |
|---|---|---|---|---|
| 2012/0029720 | A1* | 2/2012 | Cherian | G06Q 50/06 700/297 |
| 2012/0310423 | A1* | 12/2012 | Taft | H02J 13/0013 700/286 |
| 2016/0013652 | A1* | 1/2016 | Li | H02J 9/061 307/24 |
| 2016/0179077 | A1 | 6/2016 | Le Boudec et al. | |
| 2016/0363950 | A1* | 12/2016 | Friedrich | G05F 1/66 |
| 2018/0366978 | A1* | 12/2018 | Matan | G05B 19/042 |
| 2019/0020220 | A1 | 1/2019 | Lian et al. | |

OTHER PUBLICATIONS

Zhang et al., "Operation of Networked Microgrids in a Distribution System", Jul. 10, 2015, CSEE Journal of Power and Energy Systems, vol. 1, No. 4, Dec. 2015. (Year: 2015).*

Zhou et al., "Accelerated Voltage Regulation in Multi-Phase Distribution Networks Based on Hierarchical Distributed Algorithm", Feb. 28, 2019, IEEE Transactions on Power Systems, vol. 35, No. 3, May 2020 (Year: 2019).*

Zhou et al., "Energy Management and Power Control of a Hybrid Active Wind Generator for Distributed Power Generation and Grid Integration", Jul. 31, 2009, IEEE Transactions on Industrial Electronics, vol. 58, No. 1, Jan. 2011 (Year: 2009).*

Baran et al., "Optimal capacitor placement on radial distribution systems," IEEE Transactions on Power Delivery, Jan. 1989, vol. 4, No. 1, pp. 725-734.

Dall'Anese et al., "Optimal power flow pursuit", IEEE Transactions on Smart Grid, Mar. 2018, vol. 9, No. 2, pp. 942-952, 2018.

Koshal et al., "Multiuser optimization: Distributed algorithms and error analysis," Society for Industrial and Applied Mathematiacs, Journal on Optimization, 2011, vol. 21, No. 3, pp. 1046-1081.

Shi et al., "Distributed Optimal Energy Management in Microgrids", IEEE Transactions on Smart Grid, May 2015, vol. 6, No. 3, pp. 1137-1146.

Zhang et al., "Dynamic Power Distribution System Management With a Locally Connected Communication Network", IEEE Journal of Selected Topics in Signal Processing, Aug. 2018, vol. 12, No. 4, pp. 673-687.

Zhou et al., "An incentive-based online optimization framework for distribution grids," IEEE Transactions on Automatic Control, Jul. 2018, vol. 63, No. 7, pp. 2019-2031.

Zhou et al., "Hierarchical Distributed Voltage Regulation in Networked Autonomous Grids", IEEE American Control Conference, Philadelphia, PA, Jul. 2019, NREL/CP-5D00-73345, pp. 1-7; arXiv:1809.08624v3 [math.OC] Mar. 5, 2019.

Zhou et al., "Accelerated Voltage Regulation in Multi-Phase Distribution Networks Based on Hierarchical Distributed Algorithm", IEEE Transactions on Power Systems, May 2020, vol. 35, pp. 2047-2058.

Zhou et al., "Multi-Level Optimal Power Flow Solver in Large Distribution Networks", arXiv:2003.00333v1 [math.OC], Feb. 29, 2020, pp. 1-4.

* cited by examiner

HIERARCHICAL DISTRIBUTED VOLTAGE REGULATION

CROSS REFERENCE TO RELATED APPLICATION

The present application claims the benefits of and priority, under 35 U.S.C. § 119(e), to U.S. Provisional Application No. 62/871,769 filed Jul. 9, 2019 and entitled "Hierarchical Distributed Voltage Regulation" of which the entire disclosure is incorporated herein by reference for all purposes.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

The increasing penetration of distributed energy resources (DERs)—such as rooftop photovoltaic systems, electric vehicles, battery energy storage systems, thermostatically controlled loads, and other controllable loads—has not only provided enormous potential control flexibility, but also imposed challenging tasks of optimally coordinating a large number of networked endpoints to satisfy system-wide objectives and constraints such as demand response and voltage regulation. Distributed algorithms have been developed to facilitate the scalable control of large networks of dispatchable DERs by distributing the computational burden. Such burden distribution is either coordinated by a (logically) central controller or among neighboring agents without a central controller. In both cases, the computational loads increase as the system gets larger, making it more difficult to realize fast, real-time control. Intermittent renewable energy resources especially demand fast control paradigms considering their deepening penetration in the distribution networks causes large and rapid fluctuations in power injections and voltages. Hence, there is a need for improved methods and systems for voltage regulation in a distribution network.

BRIEF SUMMARY

In one example, a method includes determining, by a regional coordinator system comprising at least one processor, based at least in part on a set of voltage parameters from a plurality of nodes in a distribution network, power flow for an autonomous grid (AG) in the distribution network. The AG may include the plurality of nodes. The method further includes determining, by the regional coordinator system, based on the power flow for the AG, one or more power flow parameters, and outputting, by the regional coordinator system, for use by a central controller system, the one or more power flow parameters.

In another example, a system includes a processor and a memory coupled with and readable by the processor and storing therein a set of instructions which, when executed by the processor, causes the processor to determine, based at least in part on a set of voltage parameters from a plurality of nodes in a distribution network, power flow for an autonomous grid (AG) in the distribution network. The AG may include the plurality of nodes. The instructions may further cause the processor to determine, based on the power flow for the AG, one or more power flow parameters and output, for use by a central controller system of the distribution network, the one or more power flow parameters.

In another example, a system includes a regional coordinator system comprising a processor and a memory coupled with and readable by the processor of the regional coordinator system and storing therein a set of instructions which, when executed by the processor of the regional coordinator system, causes the processor of the regional coordinator system to determine, based at least in part on a set of voltage parameters from a plurality of nodes in a distribution network, power flow for an autonomous grid (AG) in the distribution network. The AG may include the plurality of nodes. The instructions may further cause the processor of the regional coordinator system to determine, based on the power flow for the AG, one or more power flow parameters and output, for use by a central controller system of the distribution network, the one or more power flow parameters. The system may also include a central controller system communicatively coupled with the regional coordinator system, the central controller comprising a processor and a memory coupled with and readable by the processor of the central controller system and storing therein a set of instructions which, when executed by the processor of the central controller system, causes the processor of the central controller system to receive the one or more power flow parameters, determine, based at least in part on power flow parameters for AGs in the distribution network and on one or more line parameters for AGs in the distribution network, one or more regional parameters for the AG, and provide, to the regional coordinator system, the one or more regional parameters.

Figure 1:
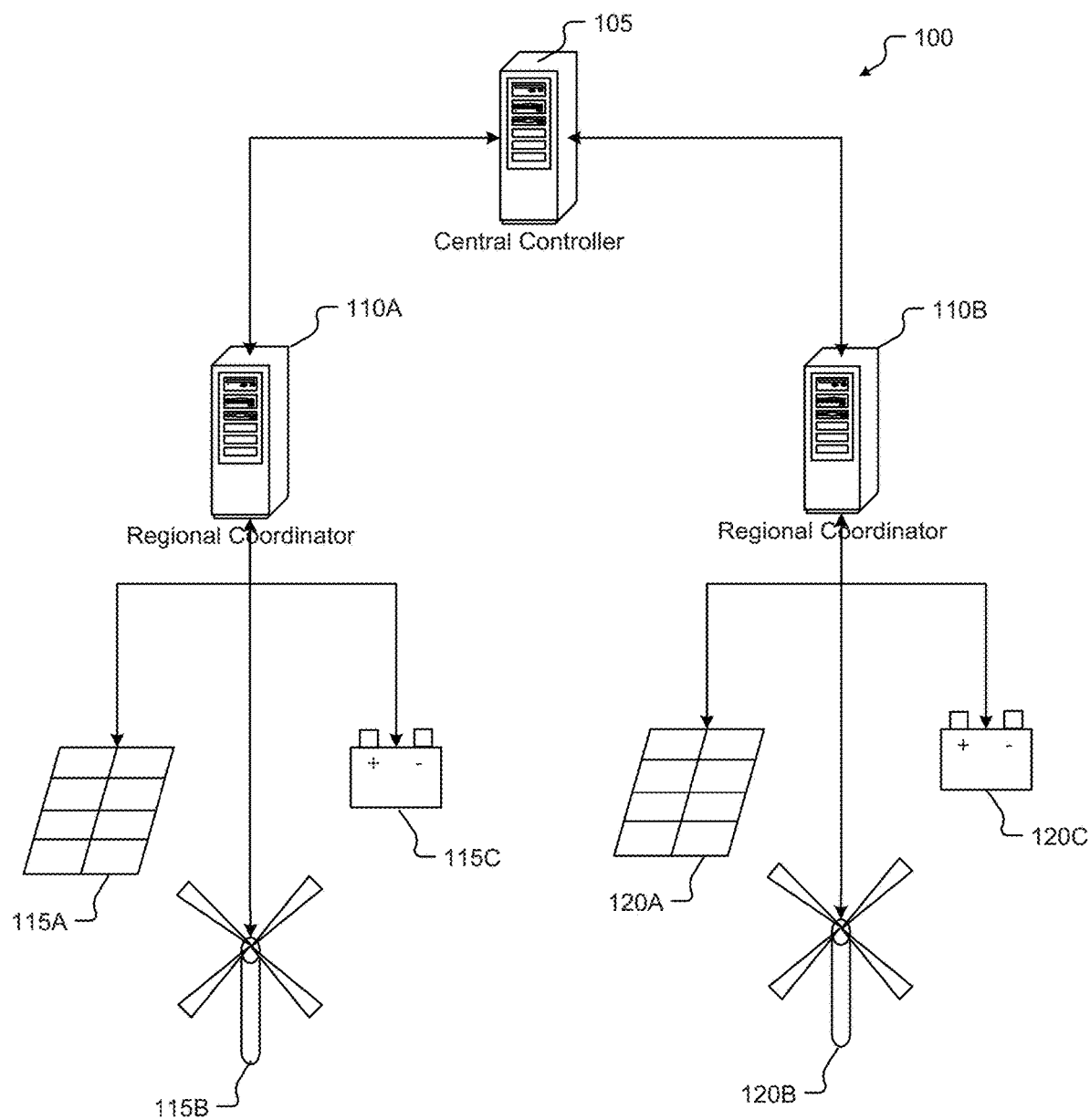
FIG. 1 is a block diagram illustrating elements of an exemplary environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Embodiments of the present disclosure are directed to systems, devices, and methods for voltage regulation in a power distribution network through an optimal power flow (OPF) solution that dispatches controllable distributed energy resources (DERs) at low cost. Large distribution networks typically have a tree-like topology. This large tree may be made up of networked autonomous grids (AGs), with each AG making up a subtree of the larger tree topology. A regional coordinator (RC) may be associated with each AG and have knowledge of the respective AG's topology and line parameters. The RC may communicate with and dispatch DERs within the associated AG.

FIG. 1 is a block diagram illustrating elements of an exemplary environment in which embodiments of the present disclosure may be implemented. As illustrated in this example, a distribution network 100 can comprise a central controller system 105 or CC as used herein. A plurality of regional coordinator systems 110A and 110B or RCs as used herein can be communicatively coupled with the central controller system 105. Furthermore, any number of DERs 115A-115C and 120A-120C can be communicatively coupled with each regional coordinator system 110A and 11B. The DERs can comprise any number or type of DER as known in the art and can include, but are not limited to, solar panels and/or solar farms, wind turbines and/or wind farms, energy storage facilities, controllable loads, etc. As illustrated in FIG. 1, the regional coordinator systems 110A and 110B, the DERs 115AC and 120AC, and the central controller system 105 are connected via communication channels (arrowed lines). The distribution network 100 may include additional and/or other components, such as power lines, switching devices, other nodes, etc. These components are not shown in the example of FIG. 1, for brevity.

Generally speaking, a set of DERs 115A-115C can generate and/or store electrical power and make that power available to a power distribution network or grid and/or can intelligently utilize electrical power (e.g., by varying usage based on criteria) as known in the art. That is, the term DER may represent something that produces energy or may represent something that consumes energy. A regional coordinator system 110A can control (directly or indirectly) the DER's supply of power to the distribution network and/or the DER's usage of power based on various criteria, including demand, for example. Embodiments of the present disclosure are directed to regulating the power flow within the distribution network in part by using the DERs 115A-115C and 120A-120C.

The control paradigm of distribution network 100 can be arranged hierarchically, wherein the central controller system 105 comprises a root node of the hierarchy, the central controller system 105 regulates each regional coordinator system 110A and 110B as nodes of the hierarchy, and the regional coordinator systems 110A and 110B, as root nodes of their respective subtrees, regulate the DERs 115A-115C and 120A-120C respectively as nodes of the subtrees.

As will be described in greater detail below, hierarchically optimizing power flow and/or regulating voltage in a distribution network 100 can comprise each regional coordinator system 110A and 110B reading or otherwise receiving a set of voltage parameters from a set of DERs 115A-115C and 120A-120C, respectively, in the distribution network 100. For example, each regional coordinator system 110A can read or otherwise receive a voltage magnitude from each DER 115A-115C. In some examples, each regional coordinator system 110A and 110B may read or otherwise receive additional or alternative electrical parameters from other nodes (e.g., devices/locations) in the distribution network 100. In some examples, such nodes include endpoints in the distribution network 100 and include intermediate nodes (i.e., not endpoints) within the distribution network 100.

Power flow for a respective portion of the distribution network 100 can then be determined by each regional coordinator system according to a set of calculations which will be defined below. More specifically, the regional coordinator system 110A may compute a voltage violation parameter for nodes in its AG, for example, by comparing the voltage magnitude of each node against predefined upper and lower voltage limits. The regional coordinator system 110A may then calculate an overall or aggregate voltage violation parameter that represents all of its respective portion of the distribution network 100. The determined overall voltage violation (also referred to herein as a power flow parameter) for the respective portion of the distribution network 100 can then be provided by the regional coordinator system 110A to the central controller system 105 of the distribution network 100.

The power flow parameters can be received by the central controller system 105 from each regional coordinator system 110A and 110B. Based on the received power flow parameters and on line parameters for each regional coordinator system 110A and 110B, the central controller system 105 can determine power flow for all of the distribution network 100, comprising the regional coordinator systems 110A and 110B, according to a set of calculations which will be defined below. The line parameters may represent an impedance from the root node of the distribution system 100 to the root node of the AGs. In some examples, regional coordinator systems may provide line parameters to the central controller system 105. In other examples, the central controller system 105 may store or otherwise have access to the line parameters.

The resulting regional parameter(s) can then be provided by the central controller system 105 to the regional coordinator system 110A to be used to manage power flow within the respective AG. For example, devices within the portion of the distribution network 100 associated with regional coordinator system 110A, such as the DERs 115A-115C.

Once the regional parameter for a regional coordinator system 110A has been received from the central controller system 105 by that regional coordinator system 110A, the regional coordinator system 110A can update the power flow for its portion of the distribution network 100 and cause controllable nodes (e.g., the set of DERs 115A-115C) to modify operation accordingly. More specifically, the regional coordinator system 110A can combine the received regional parameter with its knowledge of the current power flow and topology of its portion of the distribution network (e.g., information for that set of DERs 115A-115C such as a mathematical model of the topology that represents the location of each DER, and the voltage violation for that set of DERs 115A-115C) to cause controllable nodes to modify operation. In some examples, the regional coordinator system 110A may determine a power set point for each DER. This power set point can then be sent from the regional coordinator system 110A to each DER 115A-115C to be applied. In some examples, the regional coordinator system 110A may determine a set of coefficients that are transmitted to controllable nodes, and the controllable nodes may use such coefficients to determine a new operating point on their own.

In this way, the central controller system 105 may interpret the larger network topology as a reduced network, with each set of DERs 115A-115C and 120A-120C representing a single node in such reduced network. As such, the central controller system 105 need not know detailed information about the subtrees managed by regional coordinator systems. Instead, the central controller system 105 only need know the topology and line parameters of the reduced network. The central controller system 105 may communicate with the regional coordinator systems 110A and 110B, and the regional coordinator systems 110A and 110B may control their respective set of DERs 115A-115C and 120A-120C accordingly.

The linearized distribution power flow (LinDistFlow) model is used herein to derive a hierarchical, distributed implementation of the primal-dual gradient algorithm that solves optimal power flow (OPF).

The techniques described herein significantly reduce the computation burden compared to centrally coordinated implementations of the primal-dual algorithm. Numerical results on a 4,521-node test feeder show that the hierarchical distributed system of the present disclosure can achieve an improvement of more than tenfold in the speed of convergence compared to centrally coordinated primal-dual algorithms.

The techniques described herein address the computational burden of large systems by considering the system as a network of AGs. AGs rely on cellular building blocks that can self-optimize when isolated from neighboring grids and can participate in optimal operations when interconnected to a larger grid. Such structure allows division of the potentially immense computation into smaller problems for AGs.

The present disclosure provides techniques for controlling a potentially large distribution network in a cooperative fashion by a number of networked AGs. The techniques described herein model the distribution network using the DistFlow model (presented in, e.g., M. E. Baran and F. F. Wu, "Optimal capacitor placement on radial distribution systems," *IEEE Trans. on Power Delivery*, vol. 4, no. 1, pp. 725-734, 1989.), which captures power flows within and among AGs. In accordance with the techniques described herein, a RC communicates with all the dispatchable nodes within each AG, and a CC communicates with all the RCs. Each RC knows the topology and line parameters of the AG that it controls, and the CC knows the topology and line parameters of the reduced network, which treats each AG as a node and connects all the AGs. Given such information availability, the topological structure of the linearized DistFlow (referred to herein as LinDistFlow) model can be explored to derive a hierarchical, distributed implementation of the primal-dual gradient algorithm that solves an OPF problem. The OPF problem minimizes the total cost of all the controllable DERs and a cost associated with the total network load subject to voltage regulation constraints.

The techniques of the present disclosure may significantly reduce the computation burden compared to the centrally coordinated implementation of the primal-dual algorithm, which requires a central coordinator for the whole network. The performance of the disclosed techniques have been verified through numerical simulation of a 4,521-node test feeder. Simulation results show that an improvement of more than tenfold in the speed of convergence can be achieved by the hierarchical distributed method compared to the centrally coordinated implementation. This significant improvement in convergence speed makes real-time grid optimization and control possible. The size of the network in this simulation is possibly the largest in optimization-based control in power system.

To model the distribution system, consider a radial power distribution network denoted by $\mathcal{T} = \{\mathcal{N} \cup \{0\}, \varepsilon\}$ with $N+1$ nodes collected in the set $\mathcal{N} \cup \{0\}$, where $\mathcal{N} := \{1, \ldots, N\}$ and node 0 is the slack bus, and distribution lines collected in the set $\varepsilon$. For each node $i \in \mathcal{N}$, denote by $\varepsilon_i \subseteq \varepsilon$ the set of lines on the unique path from node 0 to node i, and let $p_i$ and $q_i$ denote the real and reactive power injected, where negative power injection means power consumption and positive power injection means power generation. Let $v_i$ be the magnitude of the complex voltage (phasor) at node i. For each line $(i,j) \in \varepsilon$ denote by $r_{ij}$ and $x_{ij}$ its resistance and reactance, and $P_{ij}$ and $Q_{ij}$ the real and reactive power from node i to node j. Let $\ell_{ij}$ denote the squared magnitude of the complex branch current (phasor) from node i to j.

The following DistFlow model can be adopted for the radial distribution network:

$$P_{ij} = -p_j + \Sigma_{k:(j,k) \in \varepsilon} P_{jk} + r_{ij}\ell_{ij}, \quad (1a)$$

$$Q_{ij} = -q_j + \Sigma_{k:(j,k) \in \varepsilon} Q_{jk} + x_{ij}\ell_{ij}, \quad (1b)$$

$$v_j^2 = v_i^2 - 2(r_{ij}P_{ij} + x_{ij}Q_{ij}) + (r_{ij}^2 + x_{ij}^2)\ell_{ij}, \quad (1c)$$

$$\ell_{ij}v_i^2 = P_{ij}^2 + Q_{ij}^2. \quad (1d)$$

The active and reactive power loss $r_{ij}\ell_{ij}$ and $x_{ij}\ell_{ij}$, as well as $r_{ij}^2 \ell_{ij}$ and $x_{ij}^2 \ell_{ij}$, as well as $r_{ij}^2 \ell_{ij}$ and $x_{ij}^2 \ell_{ij}$, are assumed to be negligible and can thus be ignored. Indeed, the losses are much smaller than power flows $P_{ij}$ and $Q_{ij}$—typically on the order of 1%. It can be further assumed that $v_i \approx 1$, $\forall i$ so that $v_j^2 - v_i^2$ can be approximated to $\approx 2(v_j - v_i)$ in Equation (1c). Note, however, that this second assumption is not essential, as q could also be used instead. This second assumption introduces a small relative error of at most 0.25% under the practically maximum 5% deviation in voltage magnitude.

With these approximations, Equations (1) can be simplified to the following linear model:

$$v = Rp + Xq + \tilde{v} \quad (2)$$

where bold symbols $v = [v_1, \ldots, v_N]^T$, $p = [p_1, \ldots, q_N]^T \in \mathbb{R}^N$ represent vectors, $\tilde{v}$ is a constant vector depending on initial conditions, and the sensitivity matrices R and X, respectively, consist of elements:

$$R_{ij} := \Sigma_{(h,k) \in \varepsilon_i \cap \varepsilon_j} r_{hk}, \quad X_{ij} := \Sigma_{(h,k) \in \varepsilon_i \cap \varepsilon_j} x_{hk}. \quad (3)$$

Figure 2:
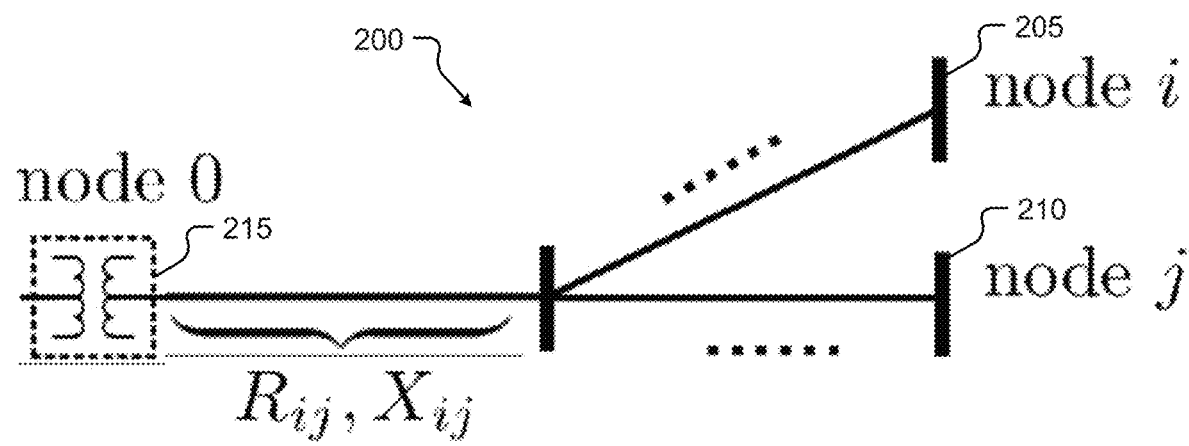
FIG. 2 is a graph representing nodes in a distribution network.

Here, the voltage-to-power-injection sensitivity factors $R_{ij}$ ($X_{ij}$) represent the resistance (reactance) of the common path of node i and j leading back to node 0. Keep in mind that this result serves as the basis for designing the hierarchical distributed algorithm introduced below. FIG. 2 is a graph representing nodes in a distribution network. More specifically, FIG. 2 is a graphical diagram illustrating $E\varepsilon_i \cap \varepsilon_j$ for two arbitrary nodes, node i 205 and node j 210, in a radial network 200, as well as their corresponding mutual voltage-to-power-injection sensitivity factors $R_{ij}$ and $X_{ij}$ relative to node 0 215.

Assume at node $i \in \mathcal{N}$ there is a dispatchable DER (or aggregation of DERs) whose real and reactive power injections are confined as $(p_i, q_i) \in \mathcal{Y}_i$, where $\mathcal{Y}_i$ is a convex and compact set. Let $P_0$ denote active power injected into the feeder at node 0, which can be approximated by the total active power loads as:

$$P_0 = -P_I - \Sigma_{i \in \mathcal{N}} p_i, \quad (4)$$

where $P_I$ denotes the uncontrollable total inelastic loads. Note that $P_0$ is negative if the total active power consumption is larger than the total active power generation. Use $v(p, q)$ and $P_0(p)$ to represent (2) and (4), respectively, and consider the following OPF problem:

$$\min_{p,q} \Sigma_{i \in \mathcal{N}} C_i(p_i, q_i) + C_0(P_0(p)), \quad (5a)$$

$$\text{s.t.} \quad \underline{v} \leq v(p,q) \leq \overline{v}, \quad (5b)$$

$$(p_i, q_i) \in y_i, \quad \forall i \in \mathcal{N} \quad (5c)$$

where the objective $C_i(p_i, q_i)$ is the cost function for node i, and the coupling term $C_0(P_0(p))$ represents the cost associated with the total network load. For example, $C_0(P_0(p)) = \alpha (P_0(p) - \hat{P}_0)^2$ penalizes $P_0(p)$'s deviation from a dispatching signal $\hat{P}_0$ with a weight $\alpha > 0$. The following assumption is made for these cost functions.

Assumption 1 $C_i(p_i, q_i)$, $\forall i \in \mathcal{N}$ are continuously differentiable and strongly convex in $(p_i, q_i)$, with bounded first-order derivative in $Y_i$. Meanwhile, $C_0(P_0)$ is continuously differentiable and convex with bounded first-order derivative.

Associate dual variables $\underline{\mu}$ and $\tilde{\mu}$ with the left-hand-side and the right-hand-side of (5b), respectively, so that the Lagrangian of (5) is written as:

$$\mathcal{L}(p,q;\underline{\mu},\overline{\mu}) = \Sigma_{i \in \mathcal{N}} C_i(p_i,q_i) + C_0(P_0(p)) + \underline{\mu}^T(\underline{v} - v(p,q)) + \overline{\mu}^T(v(p,q) - \overline{v}), \quad (6)$$

with (5c) treated as the domain of (p, q).

To design an algorithm with provable convergence, the following regularized Lagrangian with parameter $\phi > 0$ is introduced:

$$\mathcal{L}_\phi(p, q; \overline{\mu}, \mu) = \Sigma_{i \in \mathcal{N}} C_i(p_i, q_i) + \quad (7)$$

$$C_0(P_0(p)) + \mu^T(\underline{v} - v(p, q)) + \overline{\mu}^T(v(p, q) - \overline{v}) - \frac{\phi}{2}\|\mu\|_2^2,$$

where $\mu := [\underline{\mu}^T, \overline{\mu}^T]^T$.

Theorem 1 There exists one unique saddle point $(p^*, q^*; \underline{\mu}^*, \overline{\mu}^*)$ of $\mathcal{L}_\phi$.

Proof: The result follows from the fact that $\Sigma_{i \in \mathcal{N}} \phi(p, q; \underline{\mu}, \overline{\mu})$ is strongly convex in $p, q$, and strongly concave in $\underline{\mu}, \overline{\mu}$.

Theorem 2 The difference between the saddle points of (6) and (7) is bounded, and it is proportional to $\phi$.

The proof of Theorem 2 may be found in X. Zhou, et al., "An incentive-based online optimization framework for distribution grids," *IEEE Trans. on Automatic Control*, vol. 63, no. 7, pp. 2019-2031, 2018. and J. Koshal, et al., "Multiuser optimization: Distributed algorithms and error analysis," *SIAM Journal on Optimization*, vol. 21, no. 3, pp. 1046-1081, 2011.

Then, the iterative primal-dual gradient algorithm to find the saddle point of (7) is cast as follows:

$$p(t+1) = \quad (8a)$$
$$\left[p(t) - \epsilon\left(\nabla_p C(p(t), q(t)) - C_0'(P_0(p(t))) \cdot 1_N + R^T(\overline{\mu}(t) - \underline{\mu}(t))\right)\right]_{\mathcal{Y}},$$

$$q(t+1) = \left[q(t) - \epsilon\left(\nabla_q C(p(t), q(t)) + X^T(\overline{\mu}(t) - \underline{\mu}(t))\right)\right]_{\mathcal{Y}}, \quad (8b)$$

$$\underline{\mu}(t+1) = [\underline{\mu}(t) + \epsilon(\underline{v} - v(t) - \phi\underline{\mu}(t))]_+, \quad (8c)$$

$$\overline{\mu}(t+1) = [\overline{\mu}(t) + \epsilon(v(t) - \overline{v} - \phi\overline{\mu}(t))]_+, \quad (8d)$$

where $\epsilon > 0$ is some constant step size to be determined; $1_N = [1, \ldots, 1]^T \in \mathbb{R}^N$, $[\ ]_{\mathcal{Y}}$ is the projection operator onto the feasible set $\mathcal{Y} := \times_{i \in \mathcal{N}} \mathcal{Y}_i$; and $[\ ]_+$ is the projection operator onto the positive orthant.

$y := [p^T, q^T]^T$ is then used to stack all the primal variables and rewrite (8) equivalently as follows:

$$\begin{bmatrix} y(t+1) \\ \mu(t+1) \end{bmatrix} = \left[\begin{bmatrix} y(t) \\ \mu(t) \end{bmatrix} - \epsilon \begin{bmatrix} \nabla_y \mathcal{L}_\phi(y(t), \mu(t)) \\ -\nabla_\mu \mathcal{L}_\phi(y(t), \mu(t)) \end{bmatrix}\right]_{\mathcal{Y} \times \mathcal{U}}, \quad (9)$$

where $\mathcal{U}$ is the feasible positive orthant for the dual variables. Further, let $z := [y^T, \mu^T]^T$ stack all variables, and $T(z)$ is a strongly monotone operator.

$$\begin{bmatrix} \nabla_y \mathcal{L}_\phi(y, \mu) \\ -\nabla_\mu \mathcal{L}_\phi(y, \mu) \end{bmatrix}.$$

Lemma 1 $T(z)$ is a strongly monotone operator.

Proof Let $f(y) = \Sigma_{i \in \mathcal{N}} C_i(p_i, q_i) + C_0(P_0(p, q))$, and $\mu^T g(y) = \mu^T(\underline{v} - v(p, q)) + \overline{\mu}^T(v(p, q) - \overline{v})$ for simplicity. Then $T(z)$ can be equivalently decomposed into the following operators:

$$T(z) = \begin{bmatrix} \nabla_y f(y) \\ \nabla_\mu \frac{\phi}{2}\|\mu\|_2^2 \end{bmatrix} + \begin{bmatrix} \nabla_y \mu^T g(y) \\ -\nabla_\mu \mu^T g(y) \end{bmatrix} \quad (21)$$

-continued $$= \begin{bmatrix} \nabla_y f(y) \\ \nabla_\mu \frac{\phi}{2}\|\mu\|_2^2 \end{bmatrix} + \begin{bmatrix} 0 & 0 & -R^T & R^T \\ 0 & 0 & -X^T & X^T \\ R & X & 0 & 0 \\ -R & -X & 0 & 0 \end{bmatrix} \begin{bmatrix} p \\ q \\ \underline{\mu} \\ \overline{\mu} \end{bmatrix} +$$

Constant.

One can verify that the first operator $$\begin{bmatrix} \nabla_y f(y) \\ \nabla_\mu \frac{\phi}{2}\|\mu\|_2^2 \end{bmatrix}$$

is strongly monotone since $f(y)$ and $$\frac{\phi}{2}\|\mu\|_2^2$$

are strongly convex in $y$ and $\mu$, respectively. The second (linear) operator is monotone since $$\begin{bmatrix} 0 & 0 & -R^T & R^T \\ 0 & 0 & -X^T & X^T \\ R & X & 0 & 0 \\ -R & -X & 0 & 0 \end{bmatrix} + \begin{bmatrix} 0 & 0 & -R^T & R^T \\ 0 & 0 & -X^T & X^T \\ R & X & 0 & 0 \\ -R & -X & 0 & 0 \end{bmatrix} \geq 0.$$

Therefore, $T(z)$ is a strongly monotone operator as the result of combining a strongly monotone operator and a monotone operator.

By Lemma 1, there exists some constant $M > 0$ such that for any $z, z' \in \mathcal{Y} \times \mathcal{U}$, one has:

$$(T(z) - T(z'))^T(z - z') \geq M\|z - z'\|_2^2. \quad (10)$$

Moreover, based on Assumption 1, the operator $T(z)$ is also Lipschitz continuous. That is, there exists some constant $L > 0$ such that for any feasible $z$ and $z'$:

$$\|T(z) - T(z')\|_2^2 \leq L^2\|z - z'\|_2^2. \quad (11)$$

The following theorem ensures the convergence of (9) with a small enough step size.

Theorem 3 If the step size $\epsilon$ satisfies $0 < \epsilon \leq \overline{\epsilon} < 2M/L^2$ for some $\overline{\epsilon}$, (9) converges to the unique saddle point of (7) exponentially fast.

Proof Let $\Delta < 1$ be some positive constant. We have $$\|z(t+1) - z^*\|_2^2 \leq \|z(t) - \epsilon T(z(t)) - z^* + \epsilon T(z^*)\|_2^2 = \|z(t) - z^*\|_2^2 + \|\epsilon T(z(t)) - \epsilon T(z^*)\|_2^2 \epsilon(z(t) - T(z^*)) \leq (1 + \epsilon^2 L^2 - 2\epsilon M)\|z(t) - z^*\|_2^2$$

where the first inequality comes from non-expansiveness of projection operator, and the second from (10) and (11). Notice that (10) and (11) together also guarantee that $M \leq L$ so that $1 + \epsilon^2 L^2 - 2\epsilon M$ is always nonnegative. Then, based on the condition for Theorem 3 that $0 < \epsilon < 1$, $\overline{\epsilon} \leq 2M/L^2$, one has $\|z(t+1) - z^*\|_2^2 \leq \Delta\|z(t) - z^*\|_2^2$ for some constant $0 < \Delta < 1$.

Therefore, (9) converges to the unique saddle point of (7) exponentially fast.

Note that in (8) the update of any $p_i$ (resp. $q_i$) involves the knowledge of $\Sigma_{j \in \mathcal{N}} R_{ij}(\overline{\mu}_j - \underline{\mu}_j)$ (resp. $\Sigma_{j \in \mathcal{N}} X_{ij}(\overline{\mu}_j - \underline{\mu}_j)$). Therefore, at each iteration a coordinator cognizant of the entire network sensitivity matrices R and X may first collect updated dual variables from all the nodes, calculate $R^T(\bar{\mu}-\underline{\mu})$ and $X^T(\bar{\mu}-\underline{\mu})$, and then send the results back to the corresponding nodes. This becomes computationally more challenging in a larger network containing thousands (or more) of controllable endpoints, not to mention the recalculation of the huge R and X matrices in case changes in network topology or regulator taps occur.

To address this complexity, the techniques described herein utilize a hierarchical control structure where the larger network is partitioned into smaller AGs, each of which is managed locally by its own RC, and there is a CC that manages only a reduced network where each AG is treated as one node. As detailed herein, these hierarchical control techniques not only distribute the computational burden but also reduce a huge amount of computation by utilizing the network structure.

Definition 1 A subtree of a tree $\mathcal{T}$ is a tree consisting of a node in $\mathcal{T}$, all of its descendants in $\mathcal{T}$, and their connecting lines.

All the nodes of the distribution network $\mathcal{T}$ are grouped into 1) K subtrees indexed by $\mathcal{T}_k = \{\mathcal{N}_k, \varepsilon_k\}$, $k \in \mathcal{K} = \{1, \ldots, K\}$, and 2) a set $\mathcal{N}_0$ collecting all the other "un-clustered" nodes in $\mathcal{N}$. Here, $\mathcal{N}_k$ of size $\mathcal{N}_k$ is the set of nodes in subtree $\mathcal{T}_k$ and $\varepsilon_k$ contains their connecting lines. Thus, $\cup_{k \in \mathcal{K}} \mathcal{N}_k \cup \mathcal{N}_0 = \mathcal{N}$, $\mathcal{N}_j \cap \mathcal{N}_k = \emptyset$, $\forall j \neq k$. Assume each subtree $\mathcal{T}_k$ is an AG managed by an RC cognizant of the topology of $\mathcal{T}_k$ and communicating with all the controllable nodes within $\mathcal{T}_k$.

Denote the root node of subtree $\mathcal{T}_k$ by $n_k^0$, and consider a reduced network $\mathcal{T}^r = \{\mathcal{N}^r \cup \{0\}, \varepsilon^r\}$ where $\mathcal{N}^r := \cup_{k \in \mathcal{K}} \{n_k^0\} \cup \mathcal{N}$ consists of the root nodes of subtrees and all the un-clustered nodes, and $\varepsilon^r$ consists of their connecting lines. A CC is assumed cognizant of the topology of the reduced network $\mathcal{T}^r$ and communicating with all the RCs as well as the un-clustered nodes. Since each indexed subtree is considered as an AG, the terms "subtree" and "AG" are used interchangeably herein.

Figure 3:
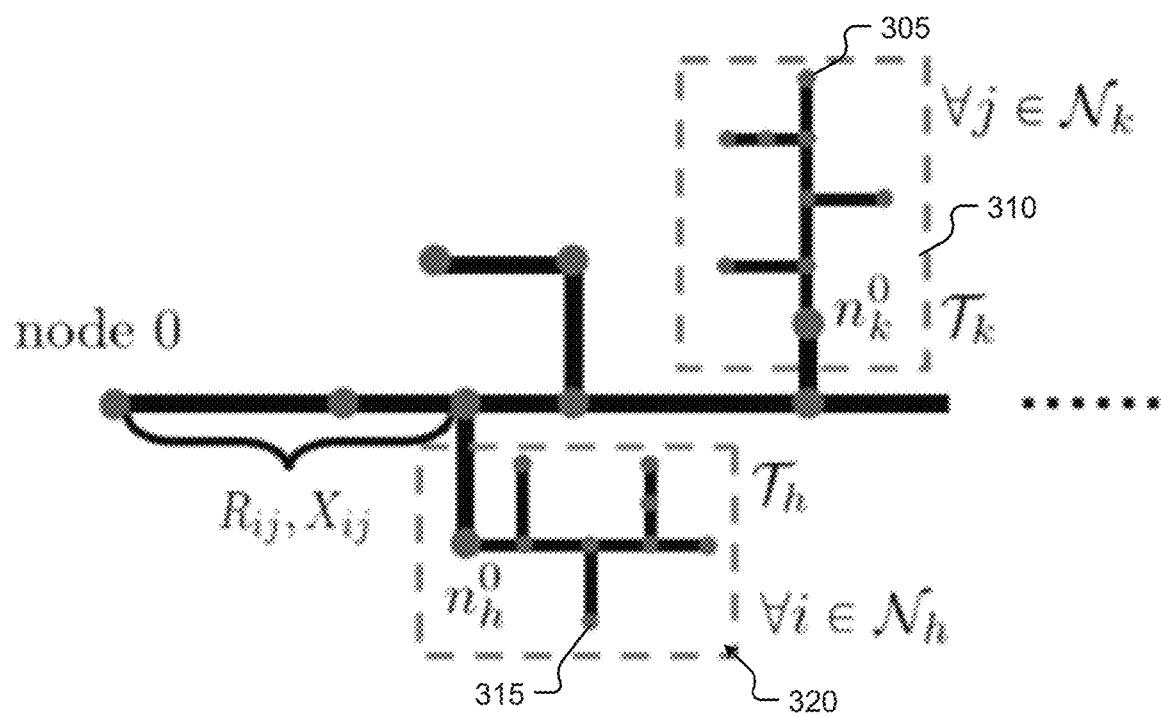
FIG. 3 is a graphical diagram illustrating a reduced network and subtrees.

FIG. 3 is a graphical diagram illustrating a reduced network and subtrees. In the example of FIG. 3, the un-clustered nodes and the root nodes of subtrees together with their connecting lines constitute the reduced network. Two subtrees $\mathcal{T}_h$ and $\mathcal{T}_k$ share the same $R_{ij}$ and $X_{ij}$ for any of their respective nodes i and j.

Based on the structure of the network matrices R and X, example operations for performing hierarchical distributed voltage regulation may be as follows. Solely for brevity, the example operations are for real power injections p only. However, operations for reactive power injections q follow similarly.

Rewrite (8a) as:

$$p_i(t+1) = [p_i(t) - \in (\delta_{p_i} C_i(p_i(t), q_i(t)) - C'_0(P_0(p(t))) + \Sigma_{j \in \mathcal{N}} R_{ij}(\bar{\mu}_j(t) - \underline{\mu}_j(t)))]_{p_i^r}, \forall i \in \mathcal{N} \quad (12)$$

Note that in (12), although $\delta_{p_i} C_i(p_i(t), q_i(t))$ is local information and the scalar $C'_0(P_0(p(t)))$ can be easily broadcast, the last term $\Sigma_{j \in \mathcal{N}} R_{ij} (\bar{\mu}_j(t) - \underline{\mu}_j(t))$ couples the whole network in principle.

To design a more scalable approach, the following lemma is first introduced:

Lemma 2 Given any two subtrees $\mathcal{T}_h$ and $\mathcal{T}_k$ with their root nodes $n_h^0$ and $n_k^0$, $R_{ij} = R_{n_h^0 n_k^0}$, $X_{ij} = X_{n_h^0 n_k^0}$, $\forall i \in \mathcal{N}_h$, $\forall j \in \mathcal{N}_k$. Similarly, given any un-clustered node $i \in \mathcal{N}_0$ and a subtree $\mathcal{T}_k$ with its root node $n_k^0$, $R_{ij} = R_{in_k^0}$, $X_{ij} = X_{in_k^0}$, $\forall j \in \mathcal{N}_k$.

Proof Consider the two following facts:
1) By (3), $R_{ij}$ (resp. $X_{ij}$) is the summed resistance (resp. reactance) of the common path of node i and j leading back to node 0.
2) Any node in one subtree and any node in another subtree (or any node in one subtree and one un-clustered node) share the same common path back to node 0.

The result is immediate from 1) and 2).

The results of Lemma 2 can be seen in FIG. 3. FIG. 3 is a graphical diagram illustrating a reduced network and subtrees. In the example of FIG. 3, any node i 305 in $\mathcal{T}$ 310 and any node j 315 in $\mathcal{T}$ 320 share the same $R_{ij} = R_{n_h^0 n_k^0}$ and $X_{ij} = X_{n_h^0 n_k^0}$, which by definition (3) are the summed resistance and reactance of their marked common path connected to node 0. Lemma 2 enables the recalculation of the coupling terms in a hierarchical distributed way. For node $i \in \mathcal{N}$: decompose $\Sigma_{j \in \mathcal{N}} R_{ij}(\bar{\mu}_j - \underline{\mu}_j)$ as:

$$\sum_{j \in \mathcal{N}} R_{ij}(\bar{\mu}_j - \underline{\mu}_j) = \sum_{j \in \mathcal{N}_k} R_{ij}(\bar{\mu}_j - \underline{\mu}_j) + \sum_{j \in \mathcal{N} \setminus \mathcal{N}_k} R_{ij}(\bar{\mu}_j - \underline{\mu}_j) = \quad (13)$$

$$\sum_{i \in \mathcal{N}_k} R_{ij}(\bar{\mu}_j - \underline{\mu}_j) \sum_{h \in \mathcal{K}, h \neq k} R_{n_h^0 n_k^0} \sum_{j \in \mathcal{N}_h} (\bar{\mu}_j - \underline{\mu}_j) +$$

$$\sum_{j \in \mathcal{N}_0} R_{n_k^0 j}(\bar{\mu}_j - \underline{\mu}_j),$$

where the first part of (13) consists of information within AG k (together with the line parameter from $n_k^0$ to bus 0, i.e., $R_{n_k^0 n_k^0}$ and $X_{n_k^0 n_k^0}$, which can be informed by CC), the second from all the other AGs, and the third from the un-clustered nodes. For convenience, denote:

$$\alpha_{k,i}^{in} = \Sigma_{j \in \mathcal{N}_k} R_{ij}(\bar{\mu}_j - \underline{\mu}_j),$$

$$\alpha_k^{out} = \Sigma_{h \in \mathcal{K}, h \neq k} R_{n_h^0 n_k^0} \Sigma_{j \in \mathcal{N}_h} (\bar{\mu}_j - \underline{\mu}_j) + \Sigma_{j \in \mathcal{N}_0} R_{n_k^0 j}(\bar{\mu}_j - \underline{\mu}_j).$$

Note that for $i \in \mathcal{N}$, $\alpha_{k,i}^{in}$ is accessible by RC k cognizant of the topology of AG k, and $\alpha_k^{out}$ does not involve the network structure of any other AGs but only that of the reduced network known by CC.

For un-clustered node $i \in \mathcal{N}$: similarly:

$$\Sigma_{j \in \mathcal{N}} R_{ij}(\bar{\mu}_j - \underline{\mu}_j) = \Sigma_{k \in \mathcal{K}} R_{in_k^0} \Sigma_{j \in \mathcal{N}_k} (\bar{\mu}_j - \underline{\mu}_j) + \Sigma_{j \in \mathcal{N}_0} R_{ij}(\bar{\mu}_j - \underline{\mu}_j), \quad (14)$$

whose computation requires only the topology and line parameters of the reduced network known by CC.

Meanwhile, computational loads are also largely reduced because: (1) the term $\Sigma_{h \in \mathcal{K}, h \neq k} R_{n_h^0 n_k^0} \Sigma_{j \in \mathcal{N}_h} (\bar{\mu}_j - \underline{\mu}_j)$ requires less computation than the original $\Sigma_{j \in \mathcal{N}_h, h \neq k} R_{ij}(\bar{\mu}_j - \underline{\mu}_j)$; and, more importantly, (2) $\alpha_k^{out}$ is the same for all nodes in $\mathcal{N}$, which reduces much of the repetitive computation that is executed by (8). Equations (13) and (14) motivate the design of the following example Algorithm 1. As discussed below, the improvement in convergence speed is more than ten times for a 4,521-node feeder, enabling fast real-time (or near-real-time) grid optimization.

In the example Algorithm 1, both the CC and RCs are in charge of only a portion of the whole system: the CC manages the reduced network and coordinates RCs and un-clustered nodes without knowing any detailed information within any AGs, and the RCs each manage their own AGs without knowing detailed information of other AGs or the reduced network.

Figure 4:
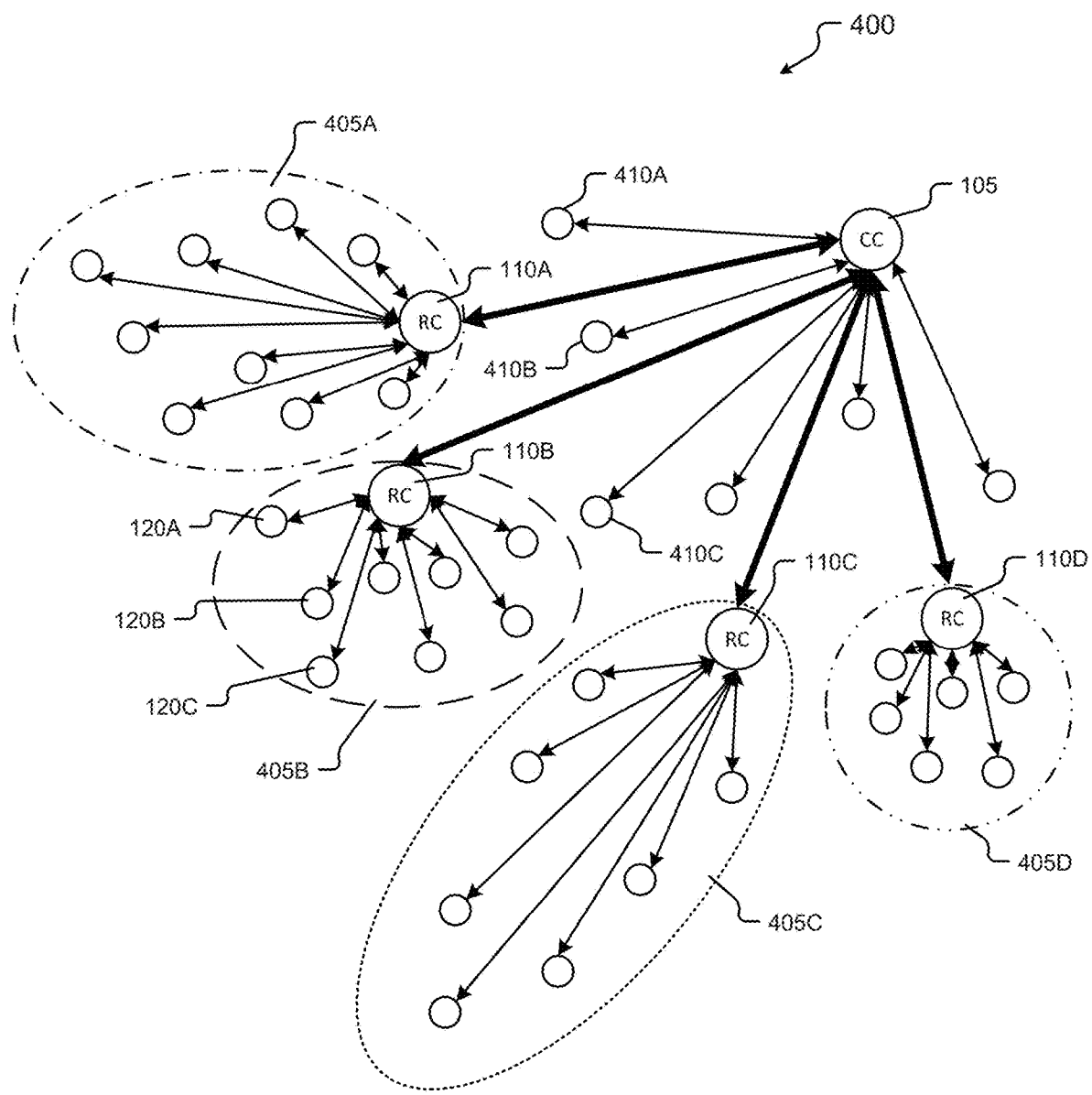
FIG. 4 is a graphical diagram illustrating clustering and the information flows within a distribution network according to one embodiment of the present disclosure.

FIG. 4 is a graphical diagram illustrating clustering and the information flows within a distribution network according to one embodiment of the present disclosure. As illustrated in this example, the distribution network 400 can comprise a central controller system 105 and a plurality of regional coordinator systems 110A-110D as described above with reference to FIG. 1. Also as described above, each regional coordinator system 110A-110D can be communicatively coupled with a set of DERs 120A-120C and/or other nodes (including controllable and uncontrollable nodes). Nodes in geographic proximity to each other or in a certain geographic area or region, can be logically clustered together with a regional coordinator system into an AG 405A-405D. So, for example, AG 405B can comprise regional coordinator system 110B and DERs 120A-120C, and possibly others. The distribution network 400 can also include a number of unclustered DERs 410A-410C and/or nodes, i.e., DERs or nodes not belonging to an AG. Generally speaking, and as illustrated here, control of the distribution network 400 can be arranged hierarchically, similar to the hierarchical structure of the distribution network 400 itself, wherein the central controller system 105 comprises a root node of the hierarchy, the central controller system 105 regulates the AGs 405A-405D as nodes of the overall distribution network 400, and the regional coordinator systems 110A-110D of each AG 405A-405D act as root nodes of AGs 405A-405D, and regulate the DERs and nodes within each AG.

FIG. 4 further illustrates clustering and the information flows of the example Algorithm 1. Because the example Algorithm 1 is mathematically equivalent to (8), the results of Theorems 1-3 also apply to Algorithm 1.

when one subtree may still contain too many nodes to be handled efficiently. As another example use, some smaller areas within subtrees may want to shelter their topology and node-wise information from an RC or CC, such as for security concerns. To address these situations, the fractal structure of tree topology allows for deeper clustering and multi-level control, i.e., applying the approaches disclosed herein to cluster nodes within a subtree into smaller "sub-subtrees." Mathematically, this is done by decomposing $\alpha_{k,i}^{in}$ the same way that $\alpha\_i$ is decomposed in (13). One of skill in the art will easily understand that even deeper clustering can be achieved as necessary to account for network size and other factors. Thus, further details are omitted for brevity.

To show the effectiveness and efficiency of the techniques described herein, numerical results are provided from a three-phase, unbalanced, 11,000-node test feeder constructed by connecting an IEEE 8,500-node test feeder and a modified EPRI Ckt7. The example of FIG. 4 shows the single-line diagram of the feeder, where the line width is proportional to the nominal power flow on it. The primary side of the feeder is modeled in detail, whereas the loads on the secondary side (which in this system is aggregation of several loads) are lumped into corresponding distribution transformers, resulting in a 4,521-node network with 1,335 aggregated loads. All the nodes are grouped into un-clustered nodes and four AGs marked in FIG. 4. AG 1 contains 357 nodes with controllable loads, AG 2 contains 222, AG

---

Algorithm 1 - example operations for performing (e.g., by one or more computing devices) hierarchical distributed voltage regulation as described herein.

--- repeat
  [1] node $i \in \mathcal{N}$ updates $(p_i(t+1), q_i(t+1))$ by
    $p_i(t+1) = [p_i(t) - \epsilon(\delta_{p_i}C_i(p_i(t), q_i(t)) - C'_0(P_0(p(t))) + \alpha_1(t))\mathcal{Y}_i$,    (15a)
    $q_i(t+1) = [q_i(t) - \epsilon(\delta_{q_i}C_i(p_i(t), q_i(t)) + \beta_i(t))\mathcal{Y}_i$,    (15b)
  and $(\underline{\mu}_i(t+1), \overline{\mu}_i(t+1))$ based on local voltage by
    $\underline{\mu}_i(t+1) = [\underline{\mu}_i(t) + \epsilon(\underline{v}_i - v_i(t) - \phi\underline{\mu}_i(t))]_+$,
    $\overline{\mu}_i(t+1) = [\overline{\mu}_i(t) + \epsilon(v_i(t) - \overline{v}_i - \phi\overline{\mu}_i(t))]_+$.    (16)
  [2] RC $k \in \mathcal{K}$ calculates and sends $\Sigma_{i \in \mathcal{N}_k}(\overline{\mu}_i(t+1) - \underline{\mu}_i(t+1))$ to CC; un-clustered node $i \in \mathcal{N}_0$ sends $(\overline{\mu}_i(t+1) - \underline{\mu}_i(t+1))$ to CC.
  [3] CC computes within the reduce network
    $\alpha_k^{out}(t+1) = \Sigma_{h \in \mathcal{K}, h \neq k} R_{m_h 0_{n_k}}(\Sigma_{j \in \mathcal{N}_h} (\overline{\mu}_j(t+1) - \underline{\mu}_j(t+1)) +$
    $\Sigma_{j \in \mathcal{N}_0} R_{m_k 0_j}(\overline{\mu}_j(t+1) - \underline{\mu}_j(t+1)), \forall k \in \mathcal{K}$    (17a)
    $\beta_k^{out}(t+1) = \Sigma_{h \in \mathcal{K}, h \neq k} X_{m_h 0_{n_k}}(\Sigma_{j \in \mathcal{N}_h} (\overline{\mu}_j(t+1) - \underline{\mu}_j(t+1)) +$
    $\Sigma_{j \in \mathcal{N}_0} X_{m_k 0_j}(\overline{\mu}_j(t+1) - \underline{\mu}_j(t+1)), \forall k \in \mathcal{K}$    (17b)
  and
    $\alpha_i(t+1) = \Sigma_{k \in \mathcal{K}} R_{in_k}(\Sigma_{j \in \mathcal{N}_k}(\overline{\mu}_j(t+1) - \underline{\mu}_j(t+1)) +$
    $\Sigma_{j \in \mathcal{N}_0} R_{ij}(\overline{\mu}_j(t+1) - \underline{\mu}_j(t+1)), \forall i \in \mathcal{N}_0$,    (18a)
    $\beta_i(t+1) = \Sigma_{k \in \mathcal{K}} X_{in_k}(\Sigma_{j \in \mathcal{N}_k}(\overline{\mu}_j(t+1) - \underline{\mu}_j(t+1)) +$
    $\Sigma_{j \in \mathcal{N}_0} X_{ij}(\overline{\mu}_j(t+1) - \underline{\mu}_j(t+1)), \forall i \in \mathcal{N}_0$,    (18b)
  and sends $(\alpha_k^{out}(t+1), \beta_k^{out}(t+1))$ to RC $k \in \mathcal{K}$, and $(\alpha_i(t+1), \beta_i(t+1))$ to un-clustered node $i \in \mathcal{N}_0$.
  [4] RC $k \in \mathcal{K}$ calculates within AG $k$:
    $\alpha_{k,i}^{in}(t+1) = \Sigma_{j \in \mathcal{N}_k} R_{ij}(\overline{\mu}_j(t+1) - \underline{\mu}_j(t+1))$, and
    $\alpha_i(t+1) = \alpha_{k,i}^{in}(t+1) + \alpha_k^{out}(t+1), \forall i \in \mathcal{N}_k$,    (19a)
    $\beta_{k,i}^{in}(t+1) = \Sigma_{j \in \mathcal{N}_k} X_{ij}(\overline{\mu}_j(t+1) - \underline{\mu}_j(t+1))$, and
    $\beta_i(t+1) = \beta_{k,i}^{in}(t+1) + \beta_k^{out}(t+1), \forall i \in \mathcal{N}_k$,    (19b)
  and sends $(\alpha_i(t+1), \beta_i(t+1))$ to node $i \in \mathcal{N}_k$.
  [5] $v(t+1)$ and $P_0(t+1)$ are updated by the physical system:
    $v(t+1) = Rp(t+1) + Xq(t+1) + \tilde{v}, P_0(t+1) = P_I + \Sigma_{i \in \mathcal{N}} p_i(t+1)$.    (20)
  [6] CC computes/measures $P_0(t+1)$ at the substitution
    and broadcasts $C'_0(P_0(p(t+1)))$.
until stopping criterion is met (e.g., $|P_0(p(t+1)) - P_0(p(t))| > \sigma \leq 0$)

---

While described herein as a two-level control hierarchy (e.g., a central controller and a set of regional coordinators), the techniques described herein may be used to implement control hierarchies of three or more levels. 3+-level systems may be useful in large distribution systems, for instance, 3 contains 310, and AG 4 contains 154. The loads are fixed on all 292 un-clustered nodes for simplicity.

For each controllable node i, the consideration was minimizing the cost of its deviation from its original load level $p_i^o$, $q_i^o$, i.e., $C_i(p_i, q_i) = (p_i - p_i^o)^2 + (q_i - q_i^o)^2$. Because the focus was on voltage regulation, $C_0(P_0)$ was set to $\alpha(P_0^2-\hat{P}_0)^2$ with a small $\alpha=0.0005$ and $\hat{P}_0$ was set to 80% of the initial $P_0$. $\underline{v}_i$ and $\overline{v}_i$ were uniformly set to 0.95 p.u. and 1.05 p.u., respectively. Algorithm 1 was implemented with a constant step size $\in=1\times10^{-3}$.

Regarding convergence, the algorithm takes about 50-60 iterations. In addition, thanks to the hierarchical design that largely reduces the computational burden, it takes about 25 seconds for the control of more than 1,000 nodes to converge on a laptop with an Intel Core i7-7600U CPU@2.80 GHz 2.90 GHz, 8.00 GB RAM, running Python 3.6 on Windows 10 Enterprise Version. On the other hand, it takes the centrally coordinated primal-dual algorithm (8) (which is implemented by a centralized coordinator for all the nodes) almost four times longer to converge. By further considering the parallel computation of four clusters, the overall improvement in speed is more than tenfold.

Figure 5:
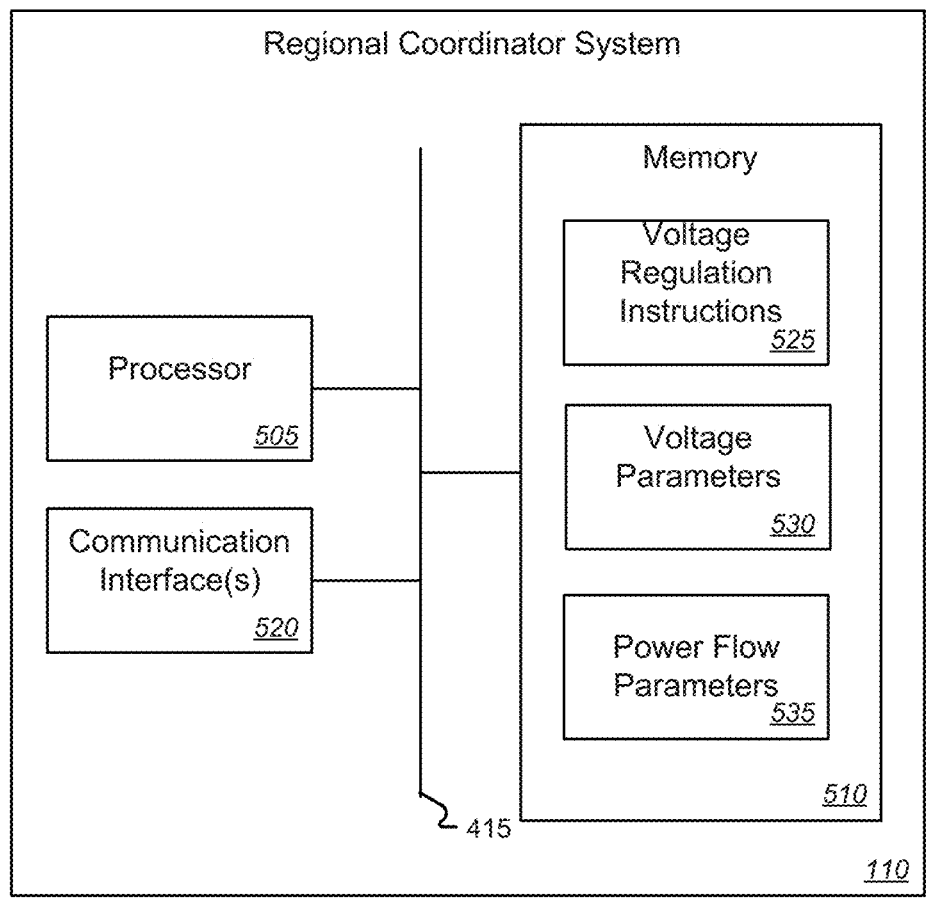
FIG. 5 is a block diagram illustrating elements of an exemplary regional coordinator according to one embodiment of the present disclosure.

FIG. 5 is a block diagram illustrating elements of an exemplary regional coordinator according to one embodiment of the present disclosure. As illustrated in this example, a regional coordinator system 110 can comprise a processor 505. The processor 505 may correspond to one or many computer processing devices. For instance, the processor 505 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 505 may be provided as a microprocessor, Central Processing Unit (CPU), or plurality of microprocessors that are configured to execute the instructions sets stored in a memory 510. Upon executing the instruction sets stored in memory 510, the processor 505 enables various functions of the regional coordinator system 110 as described herein.

A memory 510 can be coupled with and readable by the processor 505 via a communications bus 515. The memory 510 may include any type of computer memory device or collection of computer memory devices. Non-limiting examples of memory 510 include Random Access Memory (RAM), Read Only Memory (ROM), flash memory, Electronically-Erasable Programmable ROM (EEPROM), Dynamic RAM (DRAM), etc. The memory 510 may be configured to store the instruction sets depicted in addition to temporarily storing data for the processor 505 to execute various types of routines or functions.

The processor 505 can also be coupled with one or more communication interfaces 520 via the communications bus 515. The communication interfaces 520 can comprise any type of wired or wireless interface as known in the art for communicating via a wired or wireless LAN and/or WAN.

The memory 510 can store therein sets of instructions which, when executed by the processor 505, can cause the processor 505 to regulate voltage and/or optimize power flow in a distribution network that includes DERs as described herein. More specifically, the memory 510 can store a set of voltage regulation instructions 525 which can cause the processor 505 to read or otherwise receive, e.g., via communication interfaces 520, a set of voltage parameters from each of a plurality of nodes, including DERs, in the distribution network. These parameters 530 may also be stored in memory 510. As described herein, the regional coordinator system and the nodes, including the plurality of DERs, can comprise a first Autonomous Grid (AG) of a plurality of AGs in the distribution network. As described above, control of the distribution network can be arranged hierarchically, wherein a central controller system comprises a root node of the hierarchy, the central controller system regulates the AGs as nodes of the distribution network, and the regional coordinator system regulates the DERs as nodes of the first AG. Accordingly, the voltage regulation instructions 525 can cause the processor 505 to determine a power flow for the plurality of DERs in the first AG, for example, using a portion of the calculations of Algorithm 1 defined above. The voltage regulation instructions 525 can also cause the processor to provide, to a central controller system of the distribution network, e.g., via communication interfaces 520, one or more power flow parameters based on the determined power flow for the plurality of DERs in the first AG. The one or more power flow parameters 535 can also be stored in memory 510.

As noted above, power flow for each AG of the plurality of AGs, and any unclustered DERs, can then be determined by the central controller system based at least in part on the received one or more power flow parameters, for example, using a portion of the calculations of Algorithm 1 defined above, and regional parameters for the first AG based on the determined power flow for AGs of the plurality of AGs can then be returned by the central controller system to the regional coordinator system, e.g., via communication interfaces 520. Accordingly, the voltage regulation instructions 525 can cause the processor 505 to receive the regional parameters from the central controller and update or adjust the determined power flow for the plurality of DERs in the first AG, i.e., by combining the received regional parameter for the AG with information for the DERs. Based on the updated or adjusted power flow, the voltage regulation instructions 525 can cause the processor 505 to cause controllable nodes in the AG to modify operation. For example, the processor 505 may determine a power set point for each DER and send the power set point, e.g., via communication interfaces 520, to each DER to be applied, thereby modifying operation. As another example, the processor 505 may determine coefficients that may be sent to nodes, and the nodes may utilize such coefficients to determine and apply their own power set points.

Figure 6:
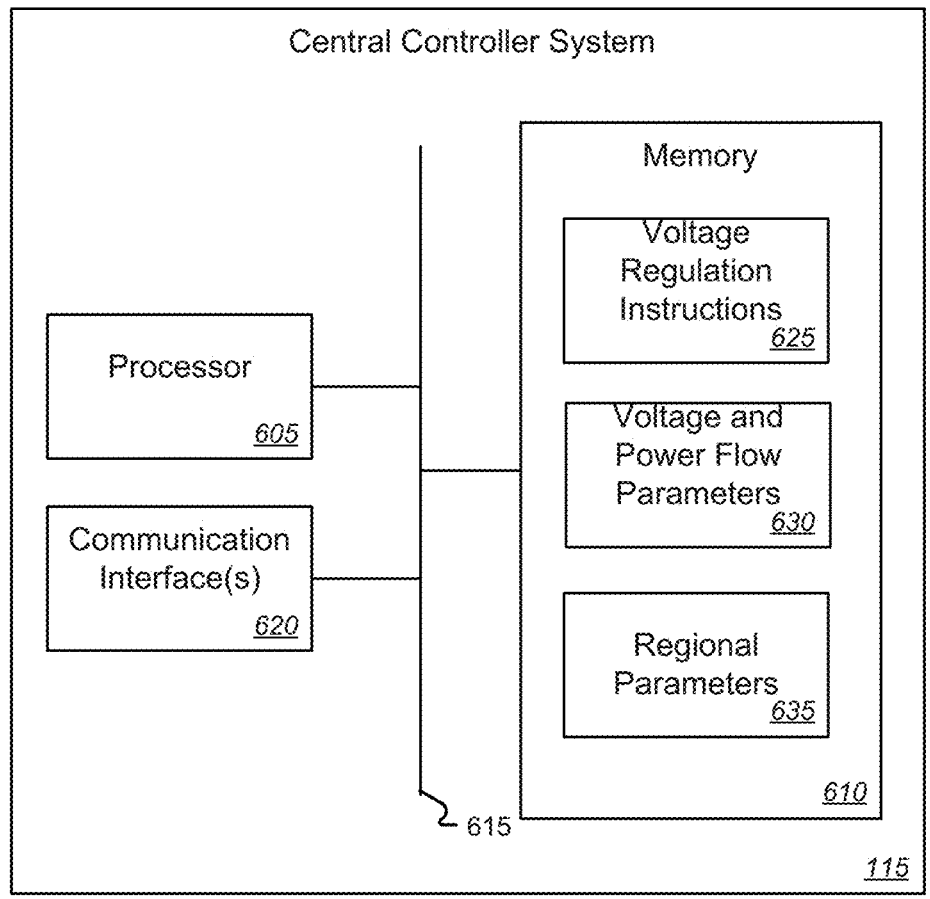
FIG. 6 is a block diagram illustrating elements of an exemplary central controller according to one embodiment of the present disclosure.

FIG. 6 is a block diagram illustrating elements of an exemplary central controller according to one embodiment of the present disclosure. As illustrated in this example, a central controller system 115 can comprise a processor 605 such as any of the various types of processors described above. A memory 610 can be coupled with and readable by the processor 605 via a communications bus 615. The memory 610 can comprise any one or more of the different types of volatile and/or non-volatile memories described above. The processor 605 can also be coupled with one or more communication interfaces 620 via the communications bus 615. The communication interfaces 620 can comprise any type of wired or wireless interface as known in the art for communicating via a wired or wireless LAN and/or WAN.

The memory 610 can store therein sets of instructions which, when executed by the processor 605, cause the processor 605 to regulate voltage and/or optimize power flow in a distribution network that includes DERs as described herein. More specifically, the memory 610 can store a set of voltage regulation instructions 625 which, when executed by the processor 605, cause the processor 605 to receive, e.g., via communication interfaces 620, one or more power flow parameters from regional coordinator systems. In some cases, the voltage regulation instructions 625 can also cause the processor to read or otherwise receive a set of voltage parameters from one or more individual DERs or other nodes and determine voltage violation of each, e.g., based on a predefined upper and lower bound.

These voltage and power flow parameters 630 can also be stored in memory 610. The individual DERs can comprise unclustered nodes of the hierarchy of the distribution network, i.e., nodes not belonging to an AG. The voltage regulation instructions 625 can then cause the processor 605 to determine power flow for each AG of the plurality of AGs, and any unclustered DERs, based at least in part on the received one or more power flow parameters and on one or more line parameters, for example, using a portion of Algorithm 1 defined above. The voltage regulation instructions 625 can then cause the processor 605 to provide to the regional coordinator system, e.g., via communication interfaces 620, regional parameters for each AG based on the determined power flow. These regional parameters 635 can also be stored in memory 610 and can be sent to the regional coordinator system to be applied.

Figure 7:
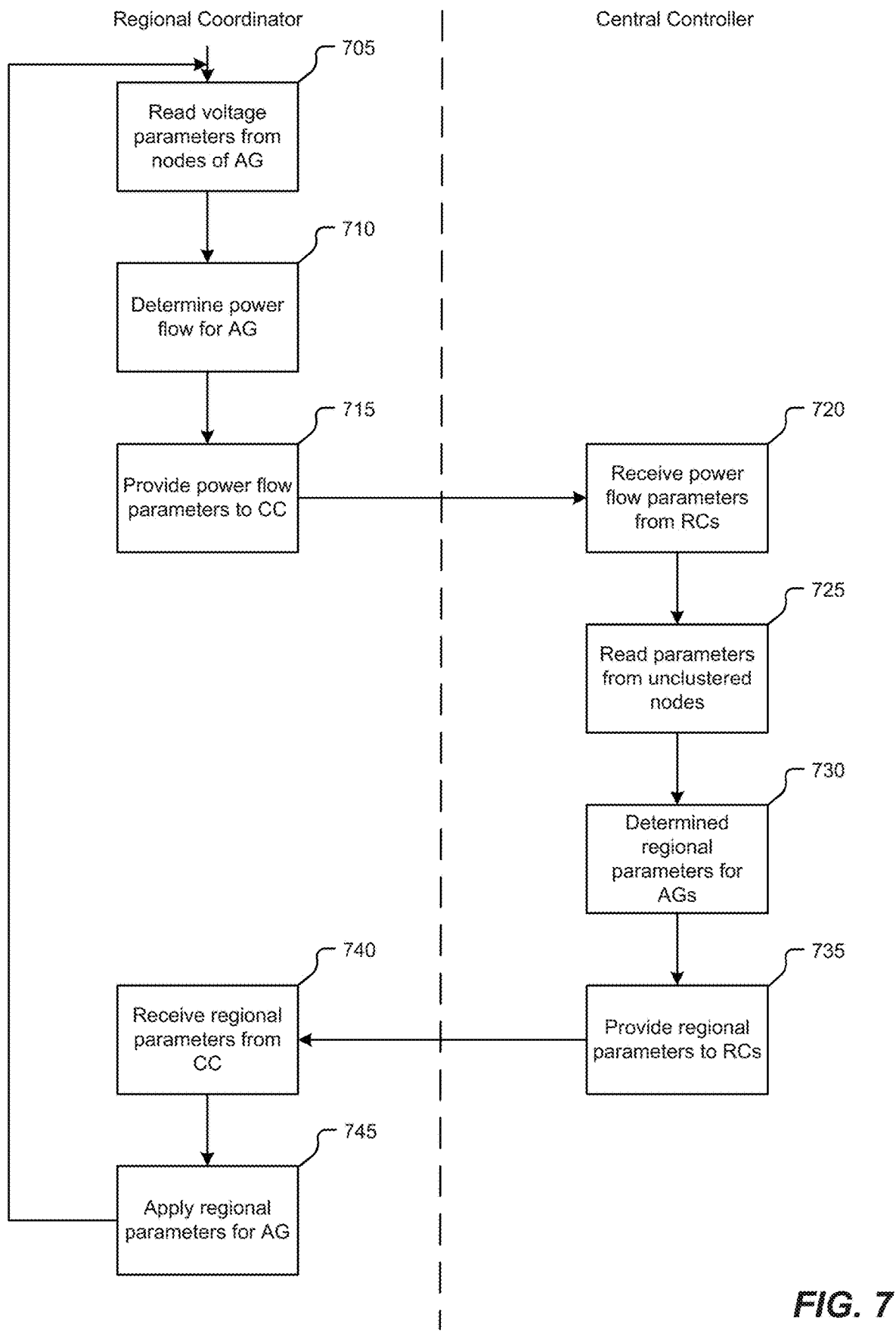
FIG. 7 is a flowchart illustrating an exemplary process for hierarchically distributed voltage regulation according to one embodiment of the present disclosure.

FIG. 7 is a flowchart illustrating an exemplary process for hierarchically distributed voltage regulation according to one embodiment of the present disclosure. As illustrated in this example, regulating voltage in a distribution network can begin with reading 705, by a regional coordinator system, (or otherwise receiving) a set of voltage parameters from each of a plurality of nodes (which may include DERs) in the distribution network, wherein the regional coordinator system and the plurality of nodes can comprise a first AG of a plurality of AGs in the distribution network. The set of voltage parameters from each node can include, but are not limited to, a current voltage magnitude. The regional coordinator system can then determine 710 power flow for the first AG and provide 715, to a central controller system of the distribution network, one or more power flow parameters based on the determined power flow. The one or more power flow parameters provided by the regional coordinator system include, but are not limited to, a voltage violation for the first AG. The voltage violation for the AG can be calculated by comparing the voltage magnitude of each DER against predefined upper and lower limits and calculating an overall voltage violation for the AG based on the voltage of each DER or other node.

The control of the distribution network can be arranged hierarchically, wherein the central controller system can comprise a root node of the hierarchy, the central controller system can regulate the AGs as nodes of the distribution network, and the regional coordinator system can regulate the DERs as nodes of the first AG. In some cases, the hierarchical voltage regulation operations can be derived utilizing a linearized DistFlow model.

The central controller system can receive 720, from the regional coordinator system, the one or more power flow parameters. In some cases, the central controller system can also read 725 or otherwise receive a set of voltage parameters from one or more individual DERs and other nodes. The individual DERs and other nodes can comprise unclustered nodes of the hierarchy of the distribution network not part of any AG. The central controller system can then determine 730 one or more regional parameters for each AG of the plurality of AGs and any unclustered DERs based at least in part on the received one or more power flow parameters and one or more line parameters representing an impedance of the path from a root of the distribution network to the root of a respective AG. The one or more regional parameters can define power flow for each AG of the plurality of AGs. The central controller system can then provide 735, to the regional coordinator system, the one or more regional parameters for the first AG based on the determined power flow for AGs of the plurality of AGs.

The regional coordinator system can then receive 740, from the central controller, the one or more regional parameters and, in some examples, apply 745 a power set point for each DER of the plurality of DERs in the first AG based on the one or more regional parameters received from the central controller and information for each DER. More specifically, the regional coordinator system can combine the received regional parameters with information for each DER in the AG, such as the location of each DER and the voltage violation of each DER. The regional coordinator system may use such combined information to determine the power set point for DERs or other nodes. The determined set point can then be sent from the regional coordinator system to the DER for controlling the DER. In some examples, the regional coordinator system may use such combined information to determine coefficients that can be supplied to nodes in the AG, and the nodes themselves can determine their own power set points using the coefficients.

At least some of the techniques of the present disclosure may be additionally or alternatively described by one or more of the following examples:

Example 1

A method comprising: determining, by a regional coordinator system comprising at least one processor, based at least in part on a set of voltage parameters from a plurality of nodes in a distribution network, power flow for an autonomous grid (AG) in the distribution network, the AG including the plurality of nodes; determining, by the regional coordinator system, based on the power flow for the AG, one or more power flow parameters; and outputting, by the regional coordinator system, for use by a central controller system, the one or more power flow parameters.

Example 2

The method of example 1, further comprising: receiving, by the regional coordinator system, one or more regional parameters for the AG, the one or more regional parameters being determined at least in part by the central controller system based at least in part on power flow parameters for AGs in the distribution network; and determining, based at least in part on the one or more regional parameters and a topology of the AG, an updated power flow for the AG; and causing, by the regional coordinator system, at least one Distributed Energy Resource (DER) in the AG to modify operation based on the updated power flow for the AG.

Example 3

The method of any of examples 1-2, further comprising: receiving, by the central controller system, the one or more power flow parameters; determining, based at least in part on power flow parameters for AGs in the distribution network and on one or more line parameters for AGs in the distribution network, one or more regional parameters for the AG; and providing, by the central controller system, to the regional coordinator system, the one or more regional parameters.

Example 4

The method of example 3, wherein the one or more regional parameters are determined based additionally on a set of voltage parameters from one or more individual nodes, wherein the individual nodes comprise unclustered nodes of the distribution network.

Example 5

The method of any of examples 3-4, wherein: the plurality of nodes comprises a first plurality of nodes, the regional coordinator system comprises a first regional coordinator system, the AG comprises a first AG in a plurality of AGs in the distribution network, the one or more power flow parameters comprise first one or more power flow parameters, the one or more regional parameters comprise first one or more regional parameters, and the one or more first regional parameters are determined based at least in part on second one or more power flow parameters corresponding to a second AG that includes a second plurality of nodes, the second one or more power flow parameters being determined by a second regional coordinator system based at least in part on voltage parameters from the second plurality of nodes.

Example 6

The method of any of examples 1-5, wherein the set of voltage parameters from each node of the plurality of nodes comprises a current voltage magnitude.

Example 7

The method of any of examples 1-6, wherein the one or more power flow parameters comprise an aggregate voltage violation for the first AG.

Example 8

A system comprising: a processor; and a memory coupled with and readable by the processor and storing therein a set of instructions which, when executed by the processor, causes the processor to: determine, based at least in part on a set of voltage parameters from a plurality of nodes in a distribution network, power flow for an autonomous grid (AG) in the distribution network, the AG including the plurality of nodes; determine, based on the power flow for the AG, one or more power flow parameters; and output, for use by a central controller system of the distribution network, the one or more power flow parameters.

Example 9

The system of example 8, wherein the set of instructions, when executed by the processor, further causes the processor to: receive one or more regional parameters for the AG, the one or more regional parameters being determined at least in part by the central controller system based at least in part on power flow parameters for AGs in the distribution network; and determine, based at least in part on the one or more regional parameters and a topology of the AG, an updated power flow for the AG; and cause at least one Distributed Energy Resource (DER) in the AG to modify operation based on the updated power flow for the AG.

Example 10

The system of example 9, wherein the one or more regional parameters for the AG is determined by the central controller system based on one or more power flow parameters from a different AG.

Example 11

The system of any of examples 8-10, wherein determining the one or more power flow parameters is based further on a power parameter of a root node of the AG.

Example 12

The system of any of examples 8-11, wherein causing the at least one DER to modify operation based on the updated power flow for the AG comprises: determining a power set point for the at least one DER; and outputting the power set point for use by the at least one DER.

Example 13

The system of any of examples 8-12, wherein the set of voltage parameters from each node of the plurality of nodes comprises a current voltage magnitude.

Example 14

The system of claim 13, wherein the one or more power flow parameters comprise a voltage violation for the AG.

Example 15

A system comprising: a regional coordinator system comprising a processor and a memory coupled with and readable by the processor of the regional coordinator system and storing therein a set of instructions which, when executed by the processor of the regional coordinator system, causes the processor of the regional coordinator system to: determine, based at least in part on a set of voltage parameters from a plurality of nodes in a distribution network, power flow for an autonomous grid (AG) in the distribution network, the AG including the plurality of nodes; determine, based on the power flow for the AG, one or more power flow parameters; and output, for use by a central controller system of the distribution network, the one or more power flow parameters; and a central controller system communicatively coupled with the regional coordinator system, the central controller comprising a processor and a memory coupled with and readable by the processor of the central controller system and storing therein a set of instructions which, when executed by the processor of the central controller system, causes the processor of the central controller system to: receive the one or more power flow parameters; determine, based at least in part on power flow parameters for AGs in the distribution network and on one or more line parameters for AGs in the distribution network, one or more regional parameters for the AG; and provide, to the regional coordinator system, the one or more regional parameters.

Example 16

The system of example 15, wherein the one or more regional parameters are determined further based on a set of voltage parameters from one or more individual nodes, wherein the individual nodes comprise unclustered nodes of the distribution network.

Example 17

The system of any of examples 15-16, wherein the instructions stored in the memory of the regional coordinator system further cause the processor of the regional coordinator system to receive, from the central controller system, the regional parameters, and determine a power set point for at least one DER in the AG based on the regional parameters.

Example 18

The system of any of examples 15-17, wherein the set of voltage parameters from each node of the plurality of nodes comprises a current voltage magnitude and wherein the one or more power flow parameters comprise a voltage violation for the AG.

The present disclosure provides techniques for a hierarchical distributed implementation of the primal-dual gradient algorithm to solve an OPF problem. The objective of the OPF is to minimize the total cost over all the controllable DERs and a cost associated with the total network load, subject to voltage regulation constraints. The techniques described herein are scalable to large distribution feeders comprising networked AGs. These techniques significantly reduce the computational burden compared to the centrally coordinated primal-dual algorithm by utilizing the information structure of the AGs. The performance of the disclosed techniques was analytically characterized and numerically corroborated. The significant improvement in convergence speed shows the great potential of the systems, devices, and methods herein for grid optimization and control in real-time or near-real-time.

In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A method comprising:
   determining, by a regional coordinator system comprising at least one processor, based at least in part on a set of voltage parameters from a plurality of nodes in a distribution network, power flow for an autonomous grid (AG) in the distribution network, the AG including the plurality of nodes;
   determining, by the regional coordinator system, based on the power flow for the AG, one or more power flow parameters;
   outputting, by the regional coordinator system, for use by a central controller system, the one or more power flow parameters;
   receiving, by the regional coordinator system, one or more regional parameters for the AG, the one or more regional parameters being determined at least in part by the central controller system based at least in part on power flow parameters for AGs in the distribution network; and
   determining, based at least in part on the one or more regional parameters and a topoloay of the AG, an updated power flow for the AG; and
   causing, by the regional coordinator system, at least one Distributed Energy Resource (DER) in the AG to modify operation based on the updated power flow for the AG.

2. The method of claim 1, wherein the one or more power flow parameters comprise an aggregate voltage violation for the first AG.

3. The method of claim 1, further comprising:
receiving, by the central controller system, the one or more power flow parameters;
determining, based at least in part on power flow parameters for AGs in the distribution network and on one or more line parameters for AGs in the distribution network, one or more regional parameters for the AG; and
providing, by the central controller system, to the regional coordinator system, the one or more regional parameters.

4. The method of claim 3, wherein the one or more regional parameters are determined based additionally on a set of voltage parameters from one or more individual nodes, wherein the individual nodes comprise unclustered nodes of the distribution network.

5. The method of claim 3, wherein:
the plurality of nodes comprises a first plurality of nodes,
the regional coordinator system comprises a first regional coordinator system,
the AG comprises a first AG in a plurality of AGs in the distribution network,
the one or more power flow parameters comprise first one or more power flow parameters,
the one or more regional parameters comprise first one or more regional parameters, and
the one or more first regional parameters are determined based at least in part on second one or more power flow parameters corresponding to a second AG that includes a second plurality of nodes, the second one or more power flow parameters being determined by a second regional coordinator system based at least in part on voltage parameters from the second plurality of nodes.

6. The method of claim 1, wherein the set of voltage parameters from each node of the plurality of nodes comprises a current voltage magnitude.

7. A system comprising:
a processor; and
a memory coupled with and readable by the processor and storing therein a set of instructions which, when executed by the processor, causes the processor to:
determine, based at least in part on a set of voltage parameters from a plurality of nodes in a distribution network, power flow for an autonomous grid (AG) in the distribution network, the AG including the plurality of nodes;
determine, based on the power flow for the AG, one or more power flow parameters;
output, for use by a central controller system of the distribution network, the one or more power flow parameters;
wherein the set of instructions, when executed by the processor, further causes the processor to:
receive one or more regional parameters for the AG, the one or more regional parameters being determined at least in part by the central controller system based at least in part on power flow parameters for AGs in the distribution network; and
determine, based at least in part on the one or more regional parameters and a topoloay of the AG, an updated power flow for the AG; and
cause at least one Distributed Energy Resource (DER) in the AG to modify operation based on the updated power flow for the AG.

8. The system of claim 7, wherein the one or more regional parameters for the AG is determined by the central controller system based on one or more power flow parameters from a different AG.

9. The system of claim 7, wherein determining the one or more power flow parameters is based further on a power parameter of a root node of the AG.

10. The system of claim 7, wherein causing the at least one DER to modify operation based on the updated power flow for the AG comprises:
determining a power set point for the at least one DER; and
outputting the power set point for use by the at least one DER.

11. The system of claim 7, wherein the set of voltage parameters from each node of the plurality of nodes comprises a current voltage magnitude.

12. The system of claim 11, wherein the one or more power flow parameters comprise a voltage violation for the AG.

13. A system comprising:
a regional coordinator system comprising a processor and a memory coupled with and readable by the processor of the regional coordinator system and storing therein a set of instructions which, when executed by the processor of the regional coordinator system, causes the processor of the regional coordinator system to:
determine, based at least in part on a set of voltage parameters from a plurality of nodes in a distribution network, power flow for an autonomous grid (AG) in the distribution network, the AG including the plurality of nodes;
determine, based on the power flow for the AG, one or more power flow parameters; and
output, for use by a central controller system of the distribution network, the one or more power flow parameters; and
a central controller system communicatively coupled with the regional coordinator system, the central controller comprising a processor and a memory coupled with and readable by the processor of the central controller system and storing therein a set of instructions which, when executed by the processor of the central controller system, causes the processor of the central controller system to:
receive the one or more power flow parameters;
determine, based at least in part on power flow parameters for AGs in the distribution network and on one or more line parameters for AGs in the distribution network, one or more regional parameters for the AG; and
provide, to the regional coordinator system, the one or more regional parameters.

14. The system of claim 13, wherein the set of voltage parameters from each node of the plurality of nodes comprises a current voltage magnitude and wherein the one or more power flow parameters comprise a voltage violation for the AG.

15. The system of claim 13, wherein the instructions stored in the memory of the regional coordinator system further cause the processor of the regional coordinator system to receive, from the central controller system, the regional parameters, and determine a power set point for at least one DER in the AG based on the regional parameters.

16. The system of claim 13, wherein the one or more regional parameters are determined further based on a set of voltage parameters from one or more individual nodes, wherein the individual nodes comprise unclustered nodes of the distribution network.

* * * * *